H. W. BELL.
RAILWAY CAR.
APPLICATION FILED OCT. 29, 1914.
1,200,300.
Patented Oct. 3, 1916.
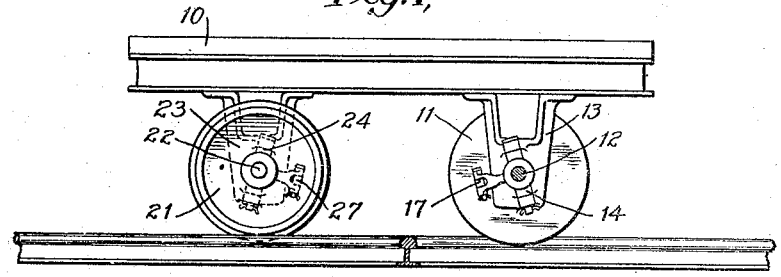
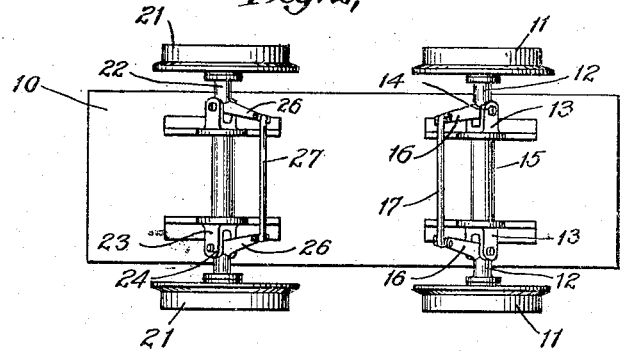
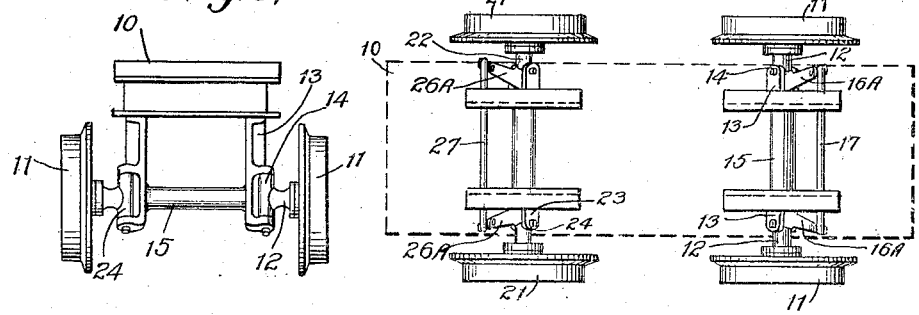
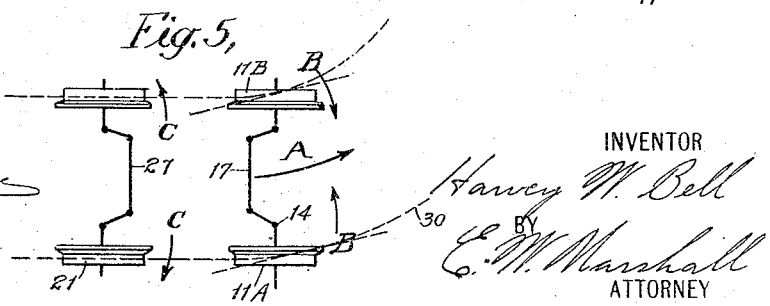
WITNESSES:
INVENTOR
Harvey W. Bell
BY
E. W. Marshall
ATTORNEY

UNITED STATES PATENT OFFICE.

HARVEY WM. BELL, OF PITTSBURGH, PENNSYLVANIA.

RAILWAY-CAR.

1,200,300.  Specification of Letters Patent.  Patented Oct. 3, 1916.

Application filed October 29, 1914. Serial No. 869,182.

*To all whom it may concern:*

Be it known that I, HARVEY W. BELL, a citizen of the United States of America, and a resident of Pittsburgh, Allegheny county, and State of Pennsylvania, have invented certain new and useful Improvements in Railway-Cars, of which the following is a specification, reference being had to the accompanying drawings, forming a part thereof.

My invention relates to improvements in railway cars and especially to a novel means of mounting the wheels of such cars in such a way as to facilitate the taking of curves.

I will describe my invention in the following specification and then point out the novel features thereof in appended claims.

Referring to the drawings: Figure 1 is a side elevation of a car embodying my invention. Fig. 2 is a bottom plan view thereof. Fig. 3 is a front elevation of the same car. Fig. 4 is a plan view showing a modified form of construction. Fig. 5 is a diagrammatic plan view of a car and track illustrating the operation of the apparatus.

Like characters of reference designate corresponding parts in all the figures.

10 designates the body of a car. The front wheels 11 are rotatably supported each upon one arm 12 of a bell crank member which is pivotally connected with a bracket 13 on the car. The axes of these pivotal connections with the car are inclined from the vertical as shown at 14. The brackets 13 may be connected by a transverse brace 15. The other arms 16 of the bell-crank members, in accordance with the usual practice with this kind of mechanism, extend when the wheels 11 are parallel with the longitudinal axis of the vehicle, in planes which intersect in a line midway between the other wheels of the vehicle, and are connected by a transverse rod 17.

The rear wheels 21 are similarly supported upon the arms 22 of bell crank members which are pivotally connected with brackets 23 longitudinally spaced on the car from the brackets 13. The axes of these pivotal connections are also inclined from the vertical as shown at 24, but in the opposite direction from the inclination of the pivotal connections 14. The other arms 26 of the rear bell-crank members are connected by a transverse rod 27.

In the modification shown in Fig. 4, the bell crank arms $16^A$—$16^A$ and $26^A$—$26^A$ project away from the center of the car instead of toward its center, but operate in substantially the same manner.

I will now refer to the diagram shown in Fig. 5 and describe the operation of this apparatus. If the car is running in the direction indicated by the arrow A, the front wheels 11 have a tendency to swing in the direction of the arrows B—B, or to "toe-in", on account of the inclination from the vertical of the inclination (shown in the other figures) of the axes of the pivotal connections 14. This tendency is however, equal and opposite when the car is running on a straight track and is balanced through the transverse rod 17. The other wheels 21 however, on account of the fact that the axes of the pivotal connections 24 is in the opposite direction to that of connections 14, have a tendency to swing in the direction of the arrows C—C, or to "toe-out". This tendency is also balanced through the transverse rod 27.

Now when the car reaches a curve in the track, as indicated at 30 in Fig. 5, the effect of the rail upon the flange of wheel $11^A$ in forcing the car around the curve and also the momentum of the mass of the car and its load, in bringing more weight upon this outer wheel, will cause the swinging-in tendency of wheel $11^A$ to be sufficiently greater than that of wheel $11^B$ to cause it to swing its bell-crank member in the desired direction, and through connection 17 to swing wheel $11^B$ around with it, but a greater amount corresponding inversely to the shorter radius of the inner rail to that of outer rail. The new positions of wheels $11^A$ and $11^B$ are indicated in dotted lines. Similarly when the wheels 21 reach the curve the outer wheel will swing outwardly and will pull its mate with it. In this manner all of the wheels will assume positions which are tangential to the curves of the rails upon which they run, so that the car will run around the curves easily.

This invention is applicable to many forms of cars with guided wheels. I intend no limitations other than those imposed in the appended claims and in the claims I intend the term "flanged" wheels to mean guided wheels as it is obvious that this invention is applicable to installations where the guiding element is on the rail instead of on the wheels and that such a modification is immaterial to the operation of this apparatus and comes within the spirit of this invention.

It has been found that a car which embodies this invention not only takes curves readily but that it also runs more easily on a straight track as the peculiar wheel mounting overcomes to a decided extent any tendency which the car may have to run to one side or the other.

What I claim is:

1. A car, a flanged wheel on each side thereof, members upon which the wheels are rotatably supported, pivotal connections between said members and the car, the axes of said connections being parallel to the plane of the adjacent wheel and inclined in a common direction from the vertical and a transverse connection between said members.

2. A car, a pair of flanged wheels one on each side of the car, members upon which the wheels are rotatably supported, pivotal connections between said members and the car, the axes of said connections being inclined in a common direction from the vertical, a second pair of flanged wheels, one on each side of the car, members upon which the second pair of wheels are rotatably mounted, pivotal connections between the last mentioned members and the car, the axes of said last mentioned connections being inclined from the vertical in a direction opposite to the inclination of said first mentioned connections.

3. A car, a bell crank member on each side thereof pivotally connected with the car, the axes of said connections being inclined in a common direction from the vertical, a flanged wheel rotatably supported on one arm of each of said members, and a connection between the other arms of said members.

4. A car, a pair of bell crank members one on each side of the car and pivotally connected therewith, the axes of said connections being inclined in a common direction from the vertical, a flanged wheel rotatably supported on one arm of each of said members, and a connection between the other arms of said members; a second pair of bell crank members one on each side of the car spaced longitudinally from the first mentioned pair of members, and pivotally connected with the car, the axes of the connections of said second pair of bell crank members being inclined from the vertical in a direction opposite to the inclination of said first mentioned connections, a flanged wheel rotatably supported on one arm of each of said second bell crank members, and a connection between the other arms of said second bell crank levers.

5. A car, a pair of flanged wheels on each side thereof, members upon which the wheels are rotatably supported, pivotal connections between said members and the car, each of the axes of said connections being parallel to the plane of the adjacent wheel and inclined from the vertical with its lower end nearer the adjacent end of the car, and means between transversely opposed wheels for causing a transverse pressure on the flange of one of said wheels to swing it and the opposite wheel about their pivotal connections.

6. A car, two bell crank members one on each side thereof pivotally connected with the car, a flanged wheel on one arm of each of said members and a rod connecting the other arms of said members, said parts being so arranged that a transverse pressure on the flange of one wheel will cause both of said members to swing on their pivots.

7. A car, two bell crank members, one on each side thereof pivotally connected with the car, a flanged wheel on one arm of each of said members, a rod connecting the other arms of said members, and two other bell crank members one on each side of the car, pivotally connected with the car at points longitudinally spaced from the first mentioned arm of each of said second mentioned bell crank members, and a rod connecting the other arms thereof.

In witness whereof, I have hereunto set my hand in the presence of two subscribing witnesses, this 27 day of October, 1914.

HARVEY WM. BELL.

Witnesses:
F. GRAVES,
E. COHEN.